(12) United States Patent
Tian

(10) Patent No.: US 11,814,241 B2
(45) Date of Patent: *Nov. 14, 2023

(54) UAV TRANSPORT BOX

(71) Applicant: Shanghai Autoflight Co., Ltd., Kunshan (CN)

(72) Inventor: Yu Tian, Hong Kong SAR (CN)

(73) Assignee: SHANGHAI AUTOFLIGHT CO., LTD., Jiangsu Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,589

(22) Filed: Jun. 7, 2022

(65) Prior Publication Data

US 2022/0396421 A1 Dec. 15, 2022

(30) Foreign Application Priority Data

Jun. 7, 2021 (CN) .......................... 202121258202.8

(51) Int. Cl.
| | | |
|---|---|---|
| *B65D 88/52* | (2006.01) | |
| *B60P 3/11* | (2006.01) | |
| *B62D 53/06* | (2006.01) | |
| *B62D 63/06* | (2006.01) | |
| *B65D 85/68* | (2006.01) | |
| *B65D 90/14* | (2006.01) | |
| *B64U 80/70* | (2023.01) | |

(52) U.S. Cl.
CPC .............. *B65D 88/522* (2013.01); *B60P 3/11* (2013.01); *B62D 53/061* (2013.01); *B62D 63/061* (2013.01); *B65D 85/68* (2013.01); *B65D 90/14* (2013.01); *B64U 80/70* (2023.01); *B65D 2585/687* (2013.01)

(58) Field of Classification Search
CPC ...... B65D 88/522; B65D 85/68; B65D 90/14; B65D 2585/687; B60P 3/11; B62D 53/061; B62D 63/061; B64U 80/70
See application file for complete search history.

(56) References Cited

U.S. PATENT DOCUMENTS

| | | | | | |
|---|---|---|---|---|---|
| 2,704,223 | A | * | 3/1955 | Houdart ................... | B60P 3/34 |
| | | | | | 74/30 |
| 5,185,973 | A | * | 2/1993 | Oldani ..................... | E04H 3/08 |
| | | | | | 52/64 |

(Continued)

FOREIGN PATENT DOCUMENTS

| | | | | | |
|---|---|---|---|---|---|
| CN | 106787105 | A | * | 5/2017 | .......... B60L 11/1809 |
| CN | 107963229 | A | * | 4/2018 | |

(Continued)

*Primary Examiner* — Jacob B Meyer
(74) *Attorney, Agent, or Firm* — WPAT LAW, P.C; Anthony King

(57) ABSTRACT

An unmanned aerial vehicle (UAV), and specifically discloses a UAV transport box. The UAV transport box has a mounting frame, a box body, a driving device, and a control system. The box body has a bottom plate and a side plate, the bottom plate is fixedly installed on the mounting frame, the UAV is arranged on the bottom plate, and the side plate can be unfolded through the driving device, so that the side plate and the bottom plate are in the same plane to form an area which is large enough to provide a suitable take-off and landing platform for the UAV, and can realize the automatic opening and closing for the UAV transport box.

10 Claims, 2 Drawing Sheets

(56) References Cited

U.S. PATENT DOCUMENTS

| | | | | |
|---|---|---|---|---|
| 5,263,601 | A * | 11/1993 | Borow | B65D 88/522 |
| | | | | 220/6 |
| 5,344,203 | A * | 9/1994 | Tollenaere | B64D 1/22 |
| | | | | 294/68.1 |
| 5,639,174 | A * | 6/1997 | Gonska | B65D 88/129 |
| | | | | 403/103 |
| 9,718,564 | B1 * | 8/2017 | Beckman | B64F 5/40 |
| 10,397,495 | B1 * | 8/2019 | Graber | B64U 80/86 |
| 10,526,094 | B2 * | 1/2020 | Cheng | B64F 1/007 |
| 11,124,297 | B2 * | 9/2021 | Sohmshetty | B64U 80/70 |
| 11,148,805 | B2 * | 10/2021 | Cooper | B64F 1/222 |
| 11,511,886 | B1 * | 11/2022 | Tian | B64F 1/22 |
| 2004/0256519 | A1 * | 12/2004 | Ellis | B64F 1/007 |
| | | | | 244/110 E |
| 2008/0111021 | A1 * | 5/2008 | Toth | B64F 1/04 |
| | | | | 244/63 |
| 2016/0364989 | A1 * | 12/2016 | Speasl | B64F 1/222 |
| 2017/0021923 | A1 * | 1/2017 | Fisher | B64F 1/005 |
| 2017/0144776 | A1 * | 5/2017 | Fisher | B64C 29/02 |
| 2017/0327091 | A1 * | 11/2017 | Capizzo | C25B 9/17 |
| 2018/0001812 | A1 * | 1/2018 | Friemel | B62D 63/08 |
| 2018/0086498 | A1 * | 3/2018 | Fenneman | B65D 88/522 |
| 2018/0086551 | A1 * | 3/2018 | Fenneman | B65D 7/30 |
| 2018/0086552 | A1 * | 3/2018 | Fenneman | B65D 88/522 |
| 2018/0170191 | A1 * | 6/2018 | Xing | B64F 1/005 |
| 2018/0212446 | A1 * | 7/2018 | Cheng | H02J 7/00 |
| 2019/0100330 | A1 * | 4/2019 | Cheng | B64C 39/024 |
| 2019/0106224 | A1 * | 4/2019 | Nishikawa | B64D 27/24 |
| 2019/0315463 | A1 * | 10/2019 | Chen | G05D 23/20 |
| 2019/0322206 | A1 * | 10/2019 | Lamy | B60P 3/14 |
| 2019/0369641 | A1 * | 12/2019 | Gillett | G05D 1/0027 |
| 2019/0383052 | A1 * | 12/2019 | Blake | B60L 53/30 |
| 2020/0001735 | A1 * | 1/2020 | Cheng | G05D 1/0676 |
| 2020/0074404 | A1 * | 3/2020 | Gil, Jr. | B64C 39/024 |
| 2020/0207485 | A1 * | 7/2020 | Foggia | B64F 1/00 |
| 2021/0197982 | A1 * | 7/2021 | Sweeny | B64F 1/222 |

FOREIGN PATENT DOCUMENTS

| | | | | |
|---|---|---|---|---|
| CN | 111803838 | A * | 10/2020 | |
| CN | 113232576 | A * | 8/2021 | B60P 3/11 |
| CN | 113370874 | A * | 9/2021 | |
| CN | 113401358 | A * | 9/2021 | |
| CN | 215097225 | U * | 12/2021 | B60P 3/11 |
| CN | 215476898 | U * | 1/2022 | B65D 88/522 |
| CN | 114701656 | A * | 7/2022 | |
| DE | 4234615 | A1 * | 6/1993 | B60P 1/64 |
| DE | 102012018836 | A1 * | 3/2014 | B65D 88/522 |
| EP | 4101759 | A1 * | 12/2022 | B65D 88/522 |
| ES | 2417280 | A2 * | 8/2013 | B60P 3/11 |
| KR | 20220025968 | A * | 3/2022 | |
| WO | WO-02062663 | A1 * | 8/2002 | B64C 39/024 |
| WO | WO-2014082104 | A1 * | 5/2014 | A01G 9/14 |
| WO | WO-2016059555 | A1 * | 4/2016 | B60L 11/1833 |
| WO | WO-2016130797 | A1 * | 8/2016 | B64C 29/02 |
| WO | WO-2017165314 | A1 * | 9/2017 | B60P 3/34 |
| WO | WO-2019055702 | A1 * | 3/2019 | B64C 39/02 |
| WO | WO-2020056309 | A1 * | 3/2020 | B64C 39/024 |
| WO | WO-2020116492 | A1 * | 6/2020 | B60L 50/60 |
| WO | WO-2022045459 | A1 * | 3/2022 | |

* cited by examiner

UAV TRANSPORT BOX

TECHNICAL FIELD

The application relates to the technical field of UAV carrying, in particular a UAV transport box.

BACKGROUND ART

Nowadays, with the rapid development and popularization of UAV technology, UAVs have been widely used in people's daily life, such as aerial photography, plant protection, fire control, power inspection, logistics and transportation. However, due to the poor working environment for outdoor tasks, UAVs often fail to take off on uneven ground, and there will be danger when they land, easily causing scraping and damage of UAV. Moreover, the operators also need to carry the UAV from the transportation to the take-off point, involving such problems as cumbersome handling process, large labor demand, long operation time, etc. In order to solve these problems, there are UAV transport boxes that can be unfolded into a take-off and landing platform in the prior art, but the cover body still needs to be manually removed from the box body, and the UAV transport box needs to be manually transported and unfolded to the operation position.

Therefore, it is urgent to provide a UAV transport box to solve the problems, such as requiring operators to carry most UAVs and the UAV transport box required to be unfolded, as well as no suitable landing site for UAVs to take off and land.

SUMMARY OF THE APPLICATION

The purpose of the application is to provide a UAV transport box to solve the technical problems, such as the transport box required to be manually carried and unfolded before the take-off of UAV, long preparation time, slow response speed, low work efficiency, and no suitable site for the UAV to take off and land.

To achieve the above purpose, the application adopts the following technical solution:

The application provides a UAV transport box, which comprises:

A mounting frame;

A box body, which comprises a bottom plate and a side plate. The side plate is rotatably connected with the bottom plate, the bottom plate is fixed on the mounting frame, and the bottom plate is used to place the UAV;

A first driving device, which is arranged on the bottom plate. The output end is connected to the side plate, and the first driving device can drive the side plate to rotate relative to the bottom plate to the same plane as the bottom plate;

A control system, which is electrically connected with the first driving device.

The side plate comprises a first side plate, a second side plate, a third side plate and a fourth side plate. The first side plate and the second side plate are arranged on opposite sides in the length direction of the bottom plate, and the third side plate and the fourth side plate are arranged on opposite sides in the width direction of the bottom plate.

The UAV transport box also includes a first upper cover plate and a second upper cover plate. The first upper cover plate connects with the third side plate, and the second upper cover plate connects with the fourth side plate.

The first upper cover plate is rotatably connected with the third side plate, the second upper cover plate is rotatably connected with the fourth side plate, a second driving device is arranged between the first upper cover plate and the third side plate, and between the second upper cover plate and the fourth side plate, and the second driving device can drive the first upper cover plate to rotate relative to the third side plate. At the same time, the second upper cover plate rotates relative to the fourth side plate.

The first upper cover plate is slidably connected with the third side plate, and the second upper cover plate is slidably connected with the fourth side plate. A third driving device is arranged between the first upper cover plate and the third side plate, and between the second upper cover plate and the fourth side plate. When the third side plate and the fourth side plate rotate to the same plane as the bottom plate, the third driving device can drive the first upper cover plate and the second upper cover plate to slide downward along the vertical direction, so that the first upper cover plate and the second upper cover plate are lowered to the same plane as the unfolded side plate and the bottom plate.

A plurality of first legs are arranged outside the side plate. When the side plate is unfolded, the first legs can be opened to support the side plate.

A plurality of second legs are arranged outside the first upper cover plate and the second upper cover plate. When the first upper cover plate and the second upper cover plate are unfolded, the second legs can be opened to support the first upper cover plate and the second upper cover plate.

The legs are retractable.

The UAV transport box also includes rollers, which are fixedly connected to the bottom of the mounting frame.

The front end of the mounting frame is provided with a towing structure.

The beneficial effects of the application are:

The application provides a UAV transport box, which comprises a mounting frame, a box body, a connecting rod mechanism, a driving device, and a control system. The box body is fixed on the mounting frame, and the driving device can unfold the box body into a plane which is large enough to provide a suitable take-off and landing platform for the UAV. It can realize the automatic opening and closing of the UAV transport box, so that the UAV can take off when it stops, which is convenient to use. At the same time, it can reduce the manpower output of operators, shorten the preparation time before operation, and result in high work efficiency.

Figure 1:
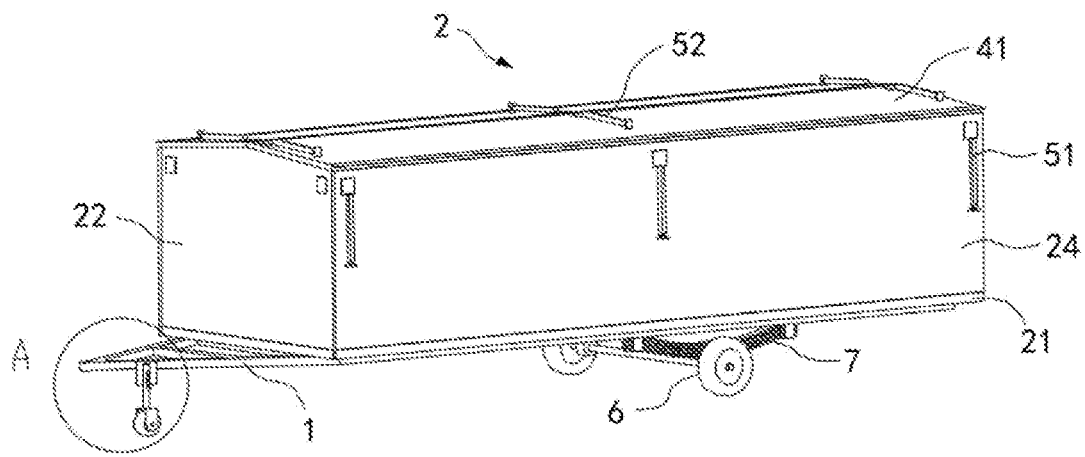
FIG. 1 is a structural diagram of the UAV transport box, in folded state, provided by Embodiment 1 of the application.

Wherein, 1. mounting frame; 2. box body; 21. bottom plate; 22. first side plate; 23. second side plate; 24. third side plate; 25. fourth side plate; 31. first driving device; 32. second driving device; 41. first upper cover plate; 42. second upper cover plate; 51. first leg; 52. second leg; 6. rollers; 7. damping device; 8. towing structure.

DESCRIPTION OF THE PREFERRED EMBODIMENTS

The following will clearly and completely describe the technical solution of the application in combination with the attached figures. Obviously, the described embodiments are part of the embodiments of the application, rather than all of them. Based on the embodiments of the application, all other embodiments obtained by ordinary technicians in the art without carrying out creative work fall within the breadth and scope of the application.

In the description of the application, it should be noted that the orientation or position relationships indicated by the terms "center", "up", "down", "left", "right", "vertical", "horizontal", "inside" and "outside" is based on the orientation or position relationships shown in the attached figures, only for the convenience of describing the application and simplifying the description, rather than indicating or implying that the device or element must have a specific orientation, or be constructed and operated in a specific orientation. Therefore, it cannot be understood as a limitation on the application. In addition, the terms "first" and "second" are used only for descriptive purposes and cannot be understood as indicating or implying relative importance. The terms "first position" and "second position" are two different positions, and the first feature "on", "over" and "above" the second feature may include the first feature directly above and obliquely above the second feature, or only indicates that the horizontal height of the first feature is higher than the second feature. The first feature "under", "below" and "beneath" the second feature may include the first feature directly below and obliquely below the second feature, or only indicate that the horizontal height of the first feature is smaller than that of the second feature.

In the description of the application, it should be noted that unless otherwise specified and limited, the terms, "connect", "connection", and "fixation" should be understood in a broad sense. For example, it can be fixedly connected, detachably connected, or integrated. It can be mechanical connection or electrical connection. It can be connected directly or indirectly through an intermediate medium, and it can be the connection between the two components. For those skilled in the art, the specific meaning of the above terms in the application can be understood in specific circumstances.

The following describes in detail the embodiments of the application. The examples of the embodiments are shown in the figures, in which the same or similar labels always represent the same or similar elements or those with the same or similar functions. The embodiments described below with reference to the appended figures are exemplary and are only used to explain the application, but cannot be understood as limitations on the application.

Embodiment 1

As shown in FIG. 1, Embodiment 1 provides a UAV transport box, which comprises a mounting frame 1, a box body 2, a first driving device 31 and a control system. Wherein, the box body 2 comprises a bottom plate 21 and a side plate, the bottom plate 21 is fixed on the mounting frame 1 for placing the UAV. A support is arranged on the side plate, and a rotating shaft is installed on the support. One end of the first driving device 31 connects with the bottom plate 21, and the other end is hinged with the support through a rotating shaft, so that the side plate can rotate relative to the bottom plate 21.

Figure 2:
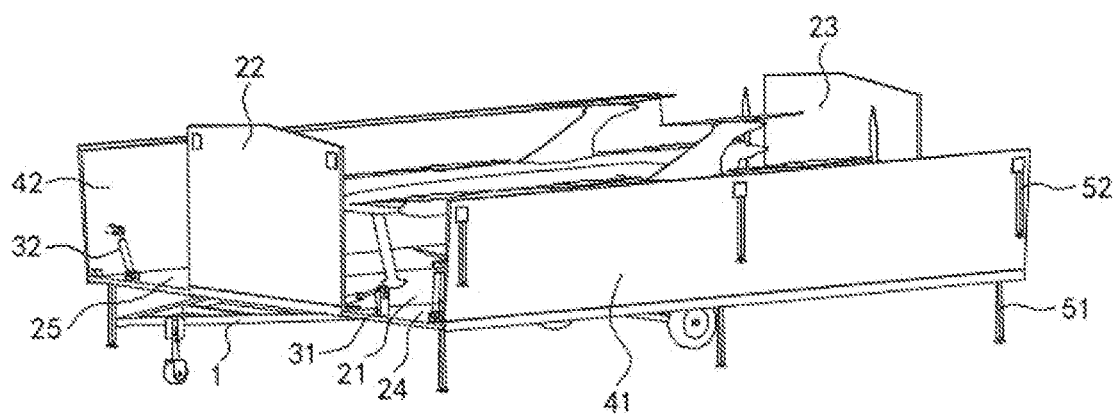
FIG. 2 is the structural diagram of the UAV transport box, with side plates unfolded, provided by Embodiment 1 of the application.

In addition, as shown in FIG. 2, the control system includes a switch. By turning on the switch, the operator can control the first driving device 31 to drive the side plate to rotate relative to the bottom plate 21, so that the side plate is unfolded to the same plane as the bottom plate 21. Through this arrangement, the problem that there is no suitable landing place for the UAV to take off and land is solved, and the UAV transport box can be opened with one key through the control system and the first drive device 31, thus reducing the preparation time in the early stage of the UAV operation task, offering fast response speed, and replacing the manual handling and unfolding of the UAV transport box, saving manpower and resulting in high work efficiency.

As one of the embodiments, a pneumatic rod may be selected for the first driving device 31, and of course, other devices with driving functions can also be selected, such as a hydraulic rod, a steering gear, etc. For example, in the UAV transport case provided in Embodiment 1, the side plates include the first side plate 22, the second side plate 23, the third side plate 24 and the fourth side plate 25. The first side plate 22 and the second side plate 23 are arranged on the opposite sides in the length direction of the bottom plate 21, and the third side plate 24 and the fourth side plate 25 are arranged on the opposite sides in the width direction of the bottom plate 21. Furthermore, a plurality of first legs 51 are arranged outside the side plate. When the side plate is unfolded, the first legs 51 can be opened to support the side plate. The legs are set as retractable legs. When the UAV transport box encounters uneven ground outdoors, the horizontal position of the unfolded side plate can be adjusted through the first legs 51 with retraction function to ensure the flatness of the unfolded platform, so that the UAV can take off and land smoothly.

Figure 3:
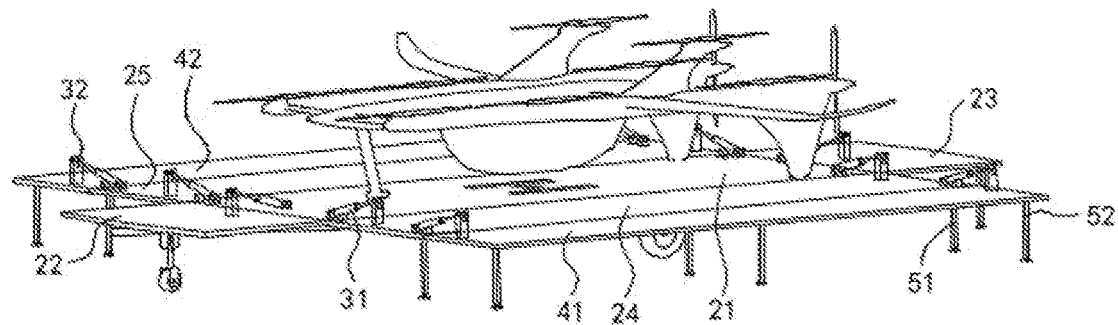
FIG. 3 is the schematic diagram of the UAV transport box, with side plates, the first upper cover plate and the second upper cover plate unfolded, provided by Embodiment 1 of the application.

In addition, as shown in FIG. 3, the UAV transport box provided in Embodiment 1 also includes a first upper cover plate 41 and a second upper cover plate 42. The first upper cover plate 41 connects with the third side plate 24, and the second upper cover plate 42 connects with the fourth side plate 25. Moreover, the first upper cover plate 41 and the second upper cover plate 42 are provided with supports, on which a rotating shaft is installed. The second drive device 32 is hinged with the support through the rotating shaft so that the second driving device 32 can drive the first upper cover plate 41 to rotate relative to the third side plate 24, and drive the second upper cover plate 42 to rotate relative to the fourth side plate 25, so as to further unfold the UAV transport box to increasing the area of the unfolded platform of the UAV transport box, thereby facilitating the outdoor operation of the UAV and avoiding bumping and damage between the UAV and the box body 2.

As one of the embodiments, a pneumatic rod may be selected for the second driving device 32, and of course, other devices with driving functions, such as a hydraulic rod and a steering gear, can also be selected.

Further, a plurality of second legs 52 are arranged on the outside of the first upper cover plate 41 and the second upper cover plate 42. When the first upper cover plate 41 and the second upper cover plate 42 are unfolded, the second legs 52 can be opened to support the first upper cover plate 41 and the second upper cover plate 42. The second legs 52 are arranged as retractable legs. Through such second legs with retractable function, the horizontal position of the unfolded first upper cover plate 41 and the second upper cover plate 42 can be adjusted to ensure the flatness of the unfolded platform, so that the UAV can take off and land smoothly.

Figure 4:
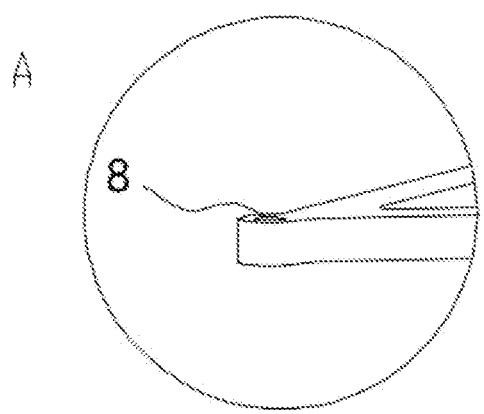
FIG. 4 is an enlarged view of Part A of the UAV transport box in FIG. 1.

As shown in FIG. 1 and FIG. 4, the UAV transport box in Embodiment 1 also includes rollers 6, which are fixedly connected to the bottom of the mounting frame 1. Moreover, the front end of the mounting frame 1 is provided with a towing structure 8. With this arrangement, the UAV transport box can be directly towed on the power vehicle for convenient transportation and disassembly. Further, the bottom of the mounting frame 1 is also provided with a damping device 7. In case of uneven road surface outdoors, the bumping of the UAV transport box can be alleviated through the damping device 7, which ensures the smooth transportation and avoid the bumping and damage of the UAV.

Embodiment 2

This embodiment provides a UAV transport box, which is different from embodiment in that the first upper cover plate 41 and the second upper cover plate 42 in this embodiment are slidably connected with the side plates. As one of the embodiments, the third side plate 24 and the fourth side plate 25 can be provided with sliding rails.

The first upper cover plate 41 and the second upper cover plate 42 are provided with sliding blocks, the first upper cover plate 41 can slide downward along the third side plate 24, and the second upper cover plate 42 can slide downward along the fourth side plate 25 by the arrangement of the sliding blocks and the sliding rails.

Further, the UAV transport box provided by this embodiment also includes a third drive device, which includes a plurality of devices, which are arranged between the first upper cover plate 41 and the third side plate 24, and between the second upper cover plate 42 and the fourth side plate 25, respectively. When the third side plate 24 and the fourth side plate 25 are unfolded to the same plane as the bottom plate 21, the third driving device can drive the first upper cover plate 41 and the second upper cover plate 42 to slide downward in the vertical direction, so that the first upper cover plate 41 and the second upper cover plate 42 are lowered to the same plane as the unfolded side plate and the bottom plate 21. Through this slidable connection, when the unfolded space is insufficient, it is possible to only unfold the side plate, and then slide down the first upper cover plate 41 and the second upper cover plate 42 along the vertical direction, so that the first upper cover plate 41 and the second upper cover plate 42 are lowered to the same plane as the unfolded side plate and the bottom plate 21, thereby providing a large enough platform for the take-off and landing of the UAV. In such case, it will not affect the take-off and landing process of the UAV, will not cause bumping and damage to the UAV, and relatively reduce the space occupied by the UAV transport box when it is unfolded, resulting in strong applicability.

The pneumatic rod may be selected for the third driving device, and of course, other devices with driving function can also be selected, such as the hydraulic rod.

Other structures of this embodiment are the same as those of Embodiment 1, and will not be further described here.

Obviously, the above embodiments of the application are only given to clearly illustrate the examples given by the application, rather than to limit the embodiments of the application. For those skilled in the art, other changes or alterations in different forms may be made on the basis of the above description. It is unnecessary and impossible to enumerate all the embodiments here. Any modification, equivalent replacement and improvement made based on the spirit and principles of the application shall fall within the breadth and scope of the claims of the application.

What is claimed is:

1. A unmanned aerial vehicle (UAV) transport box, which is characterized by comprising:
   a mounting frame (1);
   a box body (2), which comprises a bottom plate (21) and a plurality of side plates, each of the plurality of side plates is rotatably connected with the bottom plate (21), the bottom plate (21) is fixedly disposed on the mounting frame (1), and the bottom plate (21) is used to place the UAV;
   a first driving device (31), which is arranged on the bottom plate (21), the output end is connected to the side plate, and the first driving device (31) can drive the side plate to rotate relative to the bottom plate (21) to the same plane as the bottom plate (21);
   a first upper cover plate (41) and a second upper cover plate (42); and
   a control system, which is electrically connected with the first driving device (31);
   wherein the plurality of side plates includes a first side plate (22), a second side plate (23), a third side plate (24) and a fourth side plate (25); the first side plate (22) and the second side plate (23) are arranged on opposite sides in the length direction of the bottom plate (21); and the third side plate (24) and the fourth side plate (25) are arranged on opposite sides in the width direction of the bottom plate (21);
   wherein the first upper cover plate (41) connects with the third side plate (24), and the second upper cover plate (42) connects with the fourth side plate (25);
   wherein the first upper cover plate (41) is rotatably connected with the third side plate (24), the second upper cover plate (42) is rotatably connected with the fourth side plate (25).

2. The UAV transport box according to claim 1, further comprising a second driving device (32) is arranged between the first upper cover plate (41) and the third side plate (24), and between the second upper cover plate (42) and the fourth side plate (25), the second driving device (32) can drive the first upper cover plate (41) to rotate relative to the third side plate (24) and the second upper cover plate (42) to rotate relative to the fourth side plate (25).

3. The UAV transport box according to claim 2, which is characterized in that a plurality of first legs (51) are arranged outside the side plate, when the side plate is unfolded, the first legs (51) can be opened to support the side plate.

4. The UAV transport box according to claim 3, which is characterized in that a plurality of second legs (52) are arranged outside the first upper cover plate (41) and the second upper cover plate (42), when the first upper cover plate (41) and the second upper cover plate (42) are unfolded, the second legs (52) can be opened to support the first upper cover plate (41) and the second upper cover plate (42).

5. The UAV transport box according to claim 3, which is characterized in that the legs are retractable legs.

6. The UAV transport box according to claim 1, which is characterized in that the UAV transport box further comprises rollers (6), which are fixedly connected to the bottom of the mounting frame (1).

7. The UAV transport box according to claim 1, which is characterized in that the front end of the mounting frame (1) is provided with a towing structure (8).

8. The UAV transport box according to claim 4, which is characterized in that a plurality of first legs (51) are arranged outside the side plate, when the side plate is unfolded, the first legs (51) can be opened to support the side plate.

9. The UAV transport box according to claim 8, which is characterized in that a plurality of second legs (52) are arranged outside the first upper cover plate (41) and the second upper cover plate (42), when the first upper cover plate (41) and the second upper cover plate (42) are unfolded, the second legs (52) can be opened to support the first upper cover plate (41) and the second upper cover plate (42).

10. The UAV transport box according to claim 8, which is characterized in that the legs are retractable legs.

* * * * *